(12) United States Patent
Tran (10) Patent No.: US 8,972,700 B2
(45) Date of Patent: Mar. 3, 2015

(54) MICROPROCESSOR SYSTEMS AND METHODS FOR LATENCY TOLERANCE EXECUTION

(75) Inventor: Thang M. Tran, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 1040 days.

(21) Appl. No.: 13/036,251

(22) Filed: Feb. 28, 2011

(65) Prior Publication Data

US 2012/0221835 A1 Aug. 30, 2012

(51) Int. Cl.
G06F 9/38 (2006.01)
G06F 9/30 (2006.01)

(52) U.S. Cl.
CPC ............ *G06F 9/3851* (2013.01); *G06F 9/3017* (2013.01); *G06F 9/3824* (2013.01); *G06F 9/3826* (2013.01); *G06F 9/3836* (2013.01); *G06F 9/3838* (2013.01); *G06F 9/384* (2013.01)
USPC ........................................................ 712/217

(58) Field of Classification Search
CPC G06F 9/3836; G06F 9/30043; G06F 9/30051
USPC ........................................................ 712/217
See application file for complete search history.

(56) References Cited

U.S. PATENT DOCUMENTS

| | | | | |
|---|---|---|---|---|
| 5,699,537 | A * | 12/1997 | Sharangpani et al. | 712/217 |
| 6,237,081 | B1 * | 5/2001 | Le et al. | 712/214 |
| 6,728,866 | B1 * | 4/2004 | Kahle et al. | 712/217 |

OTHER PUBLICATIONS

Hilton, A., et al., "BOLT: Energy-Efficient Out-of-Order Latency-Tolerant Execution", IEEE, 2009.
Srinivasan, S.T., et al., "Continual Flow Pipelines", ASPLOS '04, Oct. 9-13, 2004.
Barnes, R.D., et al., "'Flea-flicker'* Multipass Pipelining: An alternative to the High-Power Out-of-Order offense", IEEE, Proceedings of the 38th Annual ACM International Symposium on Microarchitecture (MICRO '05), 2005.
Hilton, A., et al., "ICFP: Tolerating All-Level Cache Misses in In-Order Processors", IEEE, 2010.
Nekkalapu, S., et al., "A simple Latency Tolerant Processor", IEEE, 2008.
Srinivasan, S.T., et al., "Load Latency Tolerance in Dynamically Scheduled Processors", IEEE.
Chaudhry, S., et al., "Simultaneous Speculative Threading: A Novel Pipeline Architecture Implemented in Sun's ROCK Processor", Sun Microsystems, Inc., Jun. 24, 2009.
http://en.wikipedia.org/wiki/Rock_(processor).

* cited by examiner

*Primary Examiner* — Andrew Caldwell
*Assistant Examiner* — Benjamin Geib
(74) *Attorney, Agent, or Firm* — Mary Jo Bertani; Joanna Chiu (57) ABSTRACT

An instruction unit provides instructions for execution by a processor. A decode unit decodes instructions received from the instruction unit. Queues are coupled to receive instructions from the decode unit. Each instruction in a same queue is executed in order by a corresponding execution unit. An arbiter is coupled to each queue and to the execution unit that executes instructions of a first instruction type. The arbiter selects a next instruction of the first instruction type from a bottom entry of the queue for execution by the first execution unit.

18 Claims, 7 Drawing Sheets

| SRC0 | SRC0 DEPEND | SRC1 | SRC1 VALID | SRC1 DEPEND | DST | DST VALID | ITYPE | VALID | LSCNT | PEND | PCTAG | PDTAG |

LOAD QUEUE ENTRY

| SRC0 | SRC0 DEPEND | SRC1 | SRC1 VALID | SRC1 DEPEND | DST | DST VALID | ITYPE | VALID | LSCNT | PEND | PCTAG | PDTAG | LOAD QUEUE ID | EX QUEUE VALID |

COMMON EXTENDED QUEUE ENTRY

MICROPROCESSOR SYSTEMS AND METHODS FOR LATENCY TOLERANCE EXECUTION

BACKGROUND

1. Field

This disclosure relates generally to computer processor architecture, and more specifically, to configuring a computer processor for latency tolerance execution.

2. Related Art

One goal of ongoing processor development is to increase the number of instructions per cycle (IPC). A computer processor's IPC is typically limited by stalling of instructions in queues due to the inability to access memory when instructions are executed in-order. Issuing instructions out-of-order can help to a certain degree, but eventually stalled instructions will block other independent instructions from execution as out-of-order dependent instructions fill up the queue.

Further, there is ever-increasing pressure to reduce power consumption in computer processor devices to conserve available power and extend the operating life of portable devices between re-charging cycles.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
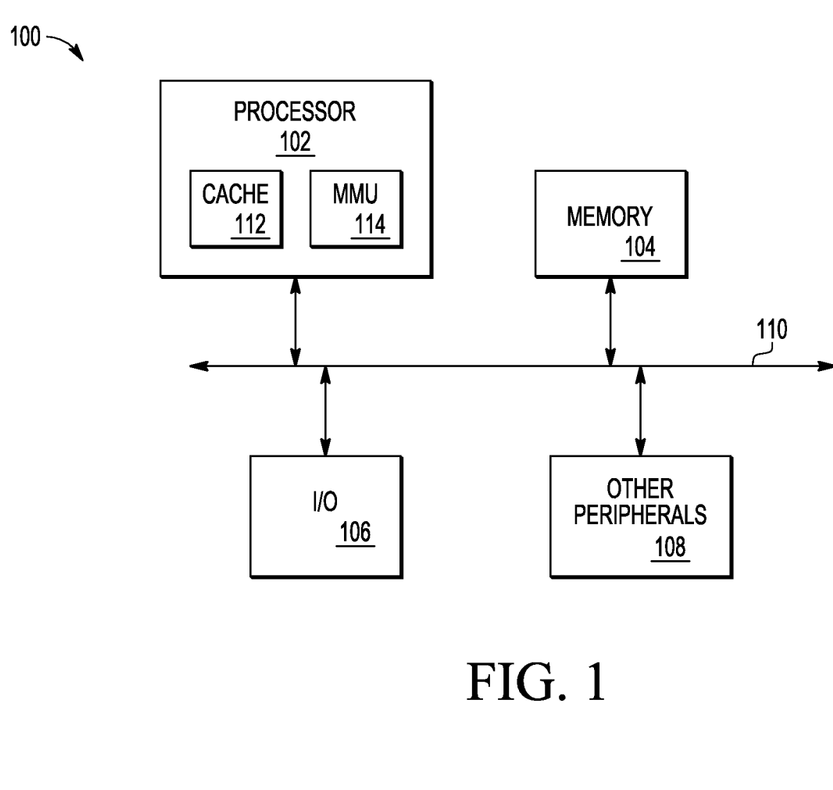
FIG. 1 is a diagram of an embodiment of a computer processing system in accordance with the present disclosure.

FIG. 1 shows a computer processing system 100 in which instruction decode and issue for latency tolerance execution can be implemented according to some embodiments of the disclosure. System 100 can be a superscalar microprocessor architecture in which instructions are issued in order to execution queues and instructions in each execution queue are executed in order but the instructions from different execution queues can execute out-of-order. At comparable performance points, system 100 has the lower power and area requirements than systems that use only out-of-order execution queues.

In the illustrated embodiment, components in computer processing system 100 include processor 102, memory 104, input/output (I/O) handlers/interfaces 106, and other peripheral devices or modules 108 which are bi-directionally coupled to bus 110 to allow communication between components. Processor 102 includes Level 1 cache memory units 112 and memory management unit (MMU) 114.

Bus 110 may communicate external to computer processing system 100. Alternate embodiments of the present disclosure may use more, less, or different components and functional blocks that those illustrated in FIG. 1. As some possible examples, alternate embodiments of computer processing system 100 may include a timer, a serial peripheral interface, a digital-to-analog converter, an analog-to digital converter, a driver (e.g. a liquid crystal display driver), and/or a plurality of types of memory.

MMU 114 is capable of providing various cache memory and bus control signals high-speed as well as virtual address to physical address translation. The virtual address is an address that is generated by processor 102 and as viewed by code that is executed by processor 102. The physical address is used to access the various higher-level memory banks such as a level-one RAM memory. Once processor 102 requests data from memory, MMU 114 can send a task identifier associated to the data request (or more generally to the task that is being executed by processor 102) to memory 104 and also to data cache internal to processor 102.

In alternate embodiments, computer processing system 100 may include one, two, or any number of processors 102. If a plurality of processors 102 are used in computer processing system 100, any number of them may be the same, or may be different. Note that although computer processing system 100 may have a plurality of processors 102, a single processor 102 which by itself can execute a plurality of instruction sets.

Memory module 104 can include a multi-level cache architecture including one or more levels of instruction cache and data cache module that have slower access rates than Level 1 cache modules 112. Memory 104 can also include an external memory that is also referred to as a main memory and can optionally include additional devices such as buffers and the like.

Figure 2:
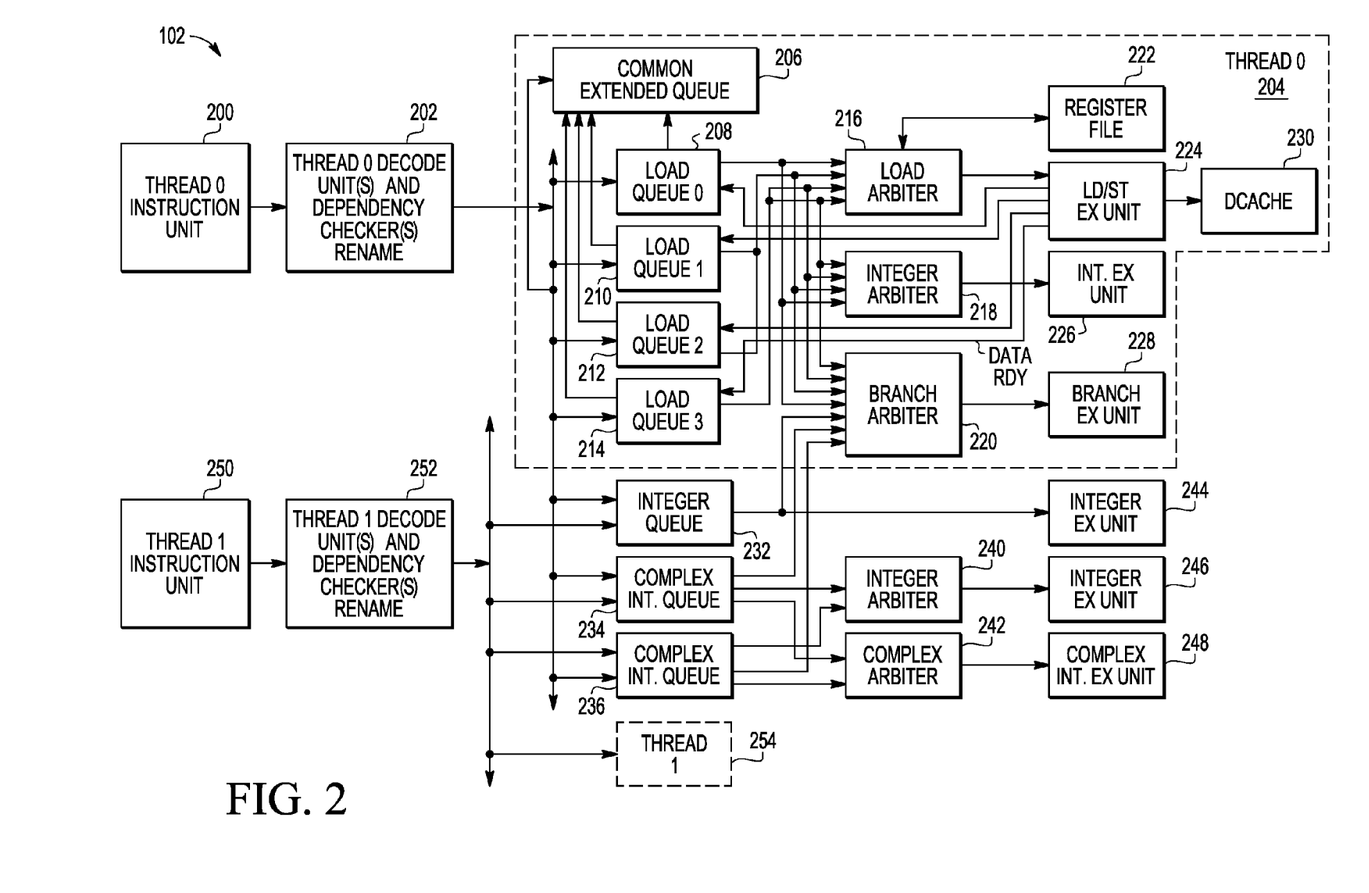
FIG. 2 is a diagram of an embodiment of instruction handling components that can be included in the computer processor of FIG. 1.

FIG. 2 is a diagram of an embodiment of instruction handling components that can be included in computer processor 102 of FIG. 1 with latency tolerance execution of one or more program threads (e.g., Thread0 and Thread1). Thread0 and Thread1 instruction units 200, 250 implement instruction queues configured to provide program instructions to respective decode units 202, 252. Decode units 202, 252 can include logic to multiplex valid instructions, decode instructions for instruction type, source, and destination operands, generate queue entries and tags for instructions, rename instruction operands to a latest register mapping, determine source and destination register dependencies between decoded instructions, check dependency with previous instructions in execution queues, and separate complex instructions into micro-instructions.

Decode units 202, 252 issue instructions to execution queues, and update register renaming for issued instructions. In the embodiment shown, a group of components 204 in processor 102 allocated to Thread0 includes common extended queue 206, load queues 208, 210, 212, 214, integer queue 232, and complex integer queues 234, 236. Another group of components 254 in processor 102 allocated to Thread1 includes a separate set of common extended queue 206 and load queues 208-214, while integer queue 232 and complex integer queues 234, 236 can be shared with Thread0.

Note that although the architecture shows components for Thread0 and Thread1, additional program threads can be executed by processor 102. For example, although not labeled in FIG. 2, the components allocated for Thread0 may be used to execute Thread0 and a Thread2 while components allocated for Thread1 may be used to execute Thread1 and a Thread3. Further, processor 102 may use components for Thread0 and Thread1 to process a greater number of instructions per cycle while executing only one thread at a time. Components that can be duplicated to support multi-threading are shown within a dashed box 204 in FIG. 2 that includes load queues 208-214, load arbiter 216, integer arbiter 218, branch arbiter 220, register file 222, load/store unit 224, integer execution unit 226, branch execution unit 228, and data cache 230.

Common extended queue 206 can be used to store overflow instructions from load queues 208-214. If extended queue 206 has any valid entries for queues 208-214, the next instruction loaded into queues 208-214 can be taken from extended queue 206 and subsequent instructions can be placed in extended queue 206 until a slot is available in queues 208-214. Queues 208-214 are designed to have optimal size for normal execution. Extended queue 206 is used to store dependent instructions that overflow the queue where the related dependent instructions are stored.

Processor 102 can further schedule execution of instructions using load arbiter 216, one or more integer arbiters 218, 240, branch arbiter 220, and complex arbiter 242. Load arbiter 216 and integer arbiter 218 can arbitrate execution of load/store and integer instructions in load queues 208-214. Branch arbiter 220 can arbitrate execution of branch instructions in load queues 208-214 as well as integer instructions in integer queue 232 and complex integer queues 234, 236. Integer arbiter 240 and complex arbiter 242 can each arbitrate integer instructions from complex integer queues 234, 236.

Microprocessors that require instructions to be executed in-order experience long delays when data required to execute the instruction is not found in cache memory, i.e., a cache miss occurs. Further, instructions that depend on one another may fill the execution queue and block the execution of independent instructions. Microprocessors that allow out-of-order execution include a replay queue for instructions that experience a data cache miss and constantly check for availability of source operands in order to execute instructions. In contrast, processor 102 includes multiple load queues 208-214 to hold the dependent instructions that experience a cache miss in the same queue until completion instead of replaying or re-issuing instructions while independent instructions are free to issue from other execution queues. Additionally, when an instruction issues, since the instructions in queues 208-214 can be in-order, data for source operands will be available from result forwarding or from register file 222. In many cases, it is possible to statistically determine when data for the source operands of an instruction will be available and schedule accordingly. However, in some cases, such as Level-1 data cache misses, the data may not be available as expected. In cases where instructions are dependent on two load instructions, the dependent instructions can be sent to two different queues 208-214. The dependent instruction in one of queues 208-214 will then be invalidated when the copy of the instruction reaches the head of another of queues 208-214.

In single thread mode, processor 102 can concurrently send two instructions to decode unit 202 and one instruction to decode unit 252 resulting in execution of three instructions per cycle. In multi-thread mode, two threads can concurrently send two instructions each to decode units 202, 252 resulting in execution of two instructions per cycle per thread. Decode units 202, 252 can also handle issuing serialize instructions such as instruction exceptions (e.g., Translation Look-aside Buffer miss, breakpoint, and illegal instruction), software interrupts (SWI), and instructions that modify processor configuration and states.

Load arbiter 216 sends instructions to Load/store unit 224. Integer arbiter 218 sends instructions to integer execution unit 226. Branch arbiter 220 sends instructions to branch execution unit 228. Integer queue 232 sends instructions to integer execution unit 244. Integer arbiter 240 sends instructions to integer execution unit 246, and complex arbiter 242 sends instructions to complex integer execution unit 248. Note that integer arbiters 218 and 240 can be combined into one arbiter that receives instructions from load queues 208-214 and complex integer queues 234, 236, and send instructions to integer execution unit 226.

Load instructions from load queues 208-214 dispatch to load/store unit 224 and will remain in a respective queue until data is returned in the next clock cycle, effectively blocking all dependent instructions until valid data is returned in the next clock cycle. Load/store unit 224 can send data ready signals to load queues 208-214 when a cache hit is detected from data cache 230. The bottom entries of load queues 208-214 can send an entry or tag that includes time stamp information to load arbiter 216. The time stamp information allows load arbiter 216 to determine and send the oldest instruction to load/store unit 224. Alternatively, load/store arbiter 216 can receive and send instructions on a round robin basis, where the first instruction that reaches arbiter 216 is the first instruction sent to load/store unit 224. The round robin basis is matched by decode units 202, 252 for issuing independent load/store instructions to load queues 208-214.

Figure 3:
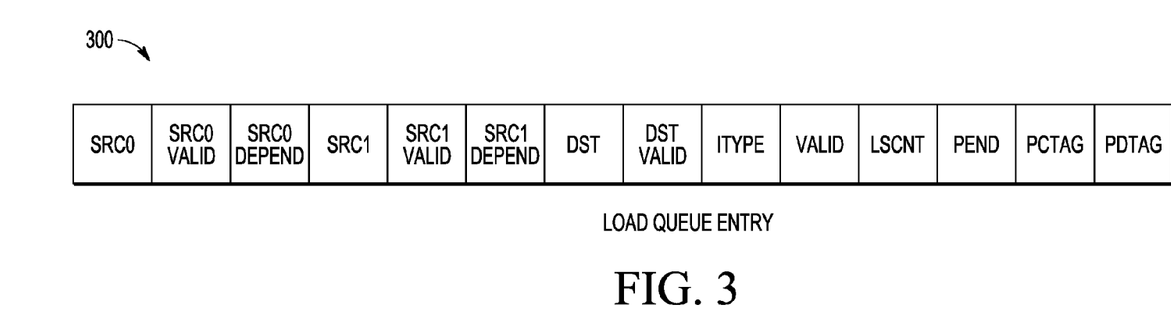
FIG. 3 is a diagram of an embodiment of a load queue entry in the computer processor of FIG. 2.

FIG. 3 is a diagram of an embodiment of load queue entry 300 that can be used for instructions in computer processor 102 of FIG. 1 that includes several fields or tags with the following labels and corresponding significance:

| | |
|---|---|
| SRC0 | first source operand |
| SRC0_VALID | first source operand is valid |
| SRC0_DEPEND | first operand depends on immediately preceding instruction in the same queue |
| SRC1 | second source operand |
| SCR1_VALID | second source operand is valid |
| SRC1_DEPEND | second operand depends on immediately preceding instruction in the same queue |
| DST | destination operand in register file to store result of instruction execution |
| DST-VALID | destination is valid |
| ITYPE | type of instruction |
| VALID | instruction entry is valid |
| LSCNT | time stamp for instruction (can be counter value or clock value) |
| PEND | instruction has been sent to load/store execution unit and is waiting for data that is ready to be sent in the next clock cycle |
| PCTAG | location of program counter information |
| PDTAG | location of branch prediction information |

Figure 4:
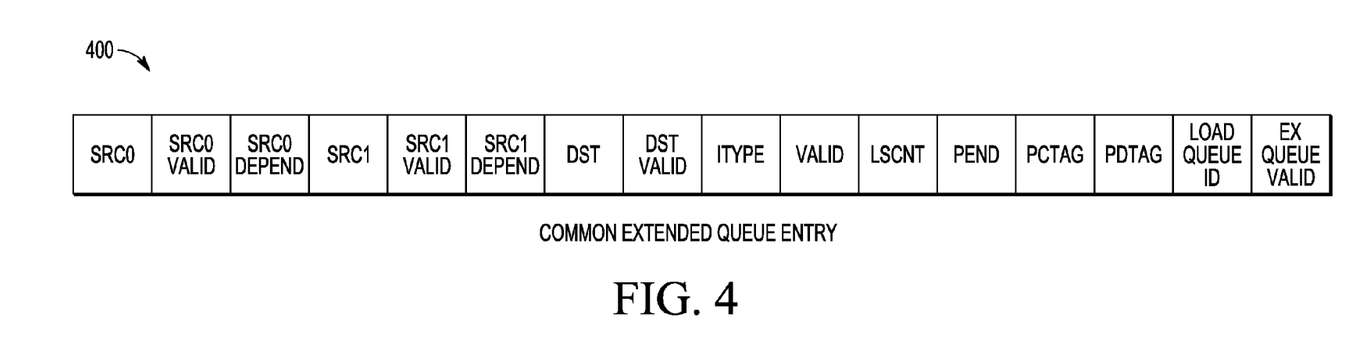
FIG. 4 is a diagram of an embodiment of an extended load queue entry in the computer processor of FIG. 2.

FIG. 4 is a diagram of an embodiment of extended load queue entry 400 that can be used for instructions in computer processor 102 of FIG. 1 that includes several fields or tags with the following labels and corresponding significance:

| | |
|---|---|
| SRC0 | first source operand |
| SRC0_VALID | first source operand is valid |
| SRC0_DEPEND | first operand depends on immediately preceding instruction in the same queue |
| SRC1 | second source operand |
| SCR1_VALID | second source operand is valid |
| SRC1_DEPEND | second operand depends on immediately preceding instruction in the same queue |

| | |
|---|---|
| DST | destination operand in register file to store result of instruction execution |
| DST-VALID | destination is valid |
| ITYPE | type of instruction |
| VALID | instruction entry is valid |
| LSCNT | time stamp for instruction (can be counter value or clock value) |
| PEND | instruction has been sent to Load/store execution unit and is waiting for data that is ready to be sent in the next clock cycle |
| PCTAG | location of program counter information |
| PDTAG | location of branch prediction information |
| LOAD_QUEUE_ID | identifies the load queue 208-214 (FIG. 2) where instruction is to be sent |
| EXTENDED QUEUE VALID | indicates whether corresponding instruction in extended queue is valid |

Other suitable fields and tags can be used in entries 300, 400 in addition to or instead of the fields/tags shown hereinabove. Entries 300, 400 can be used by decoder unit 202, load queues 208-214, common extended queue 206, and arbiters 216, 218, 220, 240, 242 to keep track of instructions. The fields/tags can be used as signals or indicators in processor 102 and methods performed therein.

With reference to FIGS. 2, 3, and 4, when a first instruction is saved to a selected queue 208-214, 232-236, a dependency indicator (SRC0_DEPEND, SRC1_DEPEND) for each corresponding operand of the first instruction can be stored in entries 300, 400 to indicate whether or not the corresponding operand depends on a second instruction that immediately precedes the first instruction within the selected queue. When the dependency indicator for the corresponding operand indicates that it does depend on the second instruction, execution units 224-228, 244-248 can feed forward the resulting data of the second instruction for the corresponding operand for use in executing the first instruction. When the dependency indicator (SRC0_DEPEND, SRC1_DEPEND) for the corresponding operand indicates that it does not depend on the second instruction, execution units 224-228, 244-248 can obtain data from register file 222 for the corresponding operand for use in executing the first instruction.

In some embodiments, when load arbiter 216 selected selects a first instruction for execution by the load/store execution unit 224 and dependency indicator (SRC0_DEPEND, SRC1_DEPEND) for the corresponding operand indicates that it does depend on a second instruction, load/store execution unit 224 feeds forward the resulting data of the second instruction for the corresponding operand for use in executing the first instruction. When the first instruction is selected by load arbiter 216 for execution by load/store execution unit 224 and the dependency indicator for the corresponding operand indicates that it does not depend on the second instruction, load/store execution unit 224 obtains data from register file 222 for the corresponding operand for use in executing the first instruction.

In some embodiments, instructions stored in load queues 208-214 have a corresponding pending indicator (PEND) which indicates whether the instruction is available for selection by load arbiter 216 when the instruction appears in a bottom entry of the load queue. Additionally, for complex instructions such as a load or store instruction, a first pending indicator (PEND) corresponding to the first micro-operation is cleared to indicate it is available for selection by load arbiter 216, and a second pending indicator (PEND) corresponding to the second micro-operation is set to indicate it is not available for selection by load arbiter 216.

In some embodiments, when a second load queue is full, the first instruction of a load queue is stored into an entry of the common extended queue (206), and load queue identifier (LOAD_QUEUE_ID) which identifies the selected load queue is stored in entry 400 of the common extended queue.

In further embodiments for complex instructions, a first micro operation of the complex instruction can be stored in a first entry 300 one of load queues 208-214 along with a first pending indicator (PEND) which indicates that the first micro operation is available for selection by load arbiter 216 when the first micro operation appears in a bottom entry the load queue. A second micro operation of the first instruction can be stored into a second entry 300 subsequent to the first entry of the first load queue along with a second pending indicator (PEND) in the second entry which indicates that the second micro operation is not available for selection by load arbiter 216 when the second micro operation appears in the bottom entry of the first load queue. After load arbiter 216 selects the first micro operation for execution by load/store unit 224, the second micro operation appears in the bottom entry of the load queue and is not selected by load arbiter 216. The second micro operation remains in the bottom entry of the load queue until an indicator is received from load/store unit 224 indicating that data for the first instruction will be received in a subsequent clock cycle.

Figure 5:
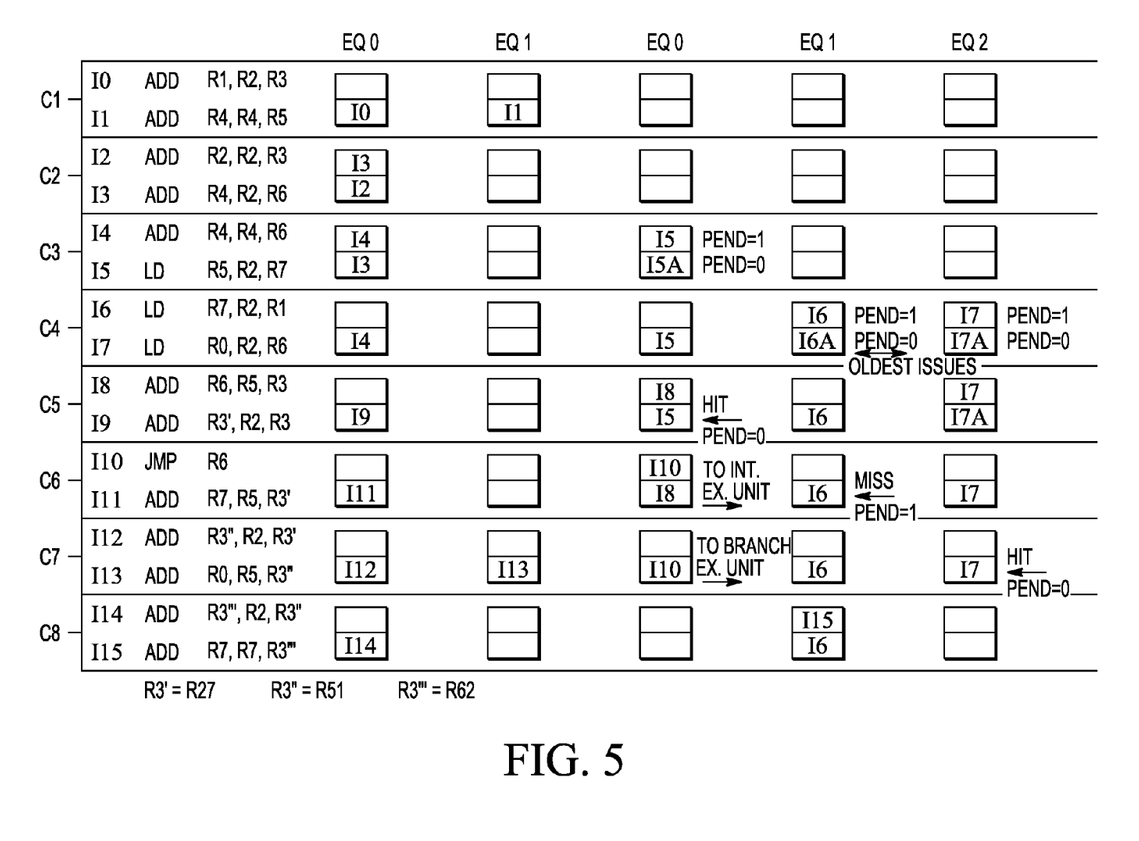
FIG. 5 is a diagram of an example of instruction handling during several clock cycles of the computer processor of FIG. 2.

Referring now to FIG. 5, a diagram of an example of instruction handling during several clock cycles of processor 102 of FIG. 1. The rows represent eight clock cycles C1-C8 with two instructions being processed per clock cycle. The instructions are labeled 10 through 115. Destination and source operands (e.g., R1, R2, R3, R6, etc.) are shown following the instructions, such as ADD (add), JMP (Jump), and LD (Load). The instructions have the form "INST RX, RY, RZ" where RX is the destination operand and RY and RZ are first and second source operands. Note that destination and source operands can be renamed by decoder units 202, 252 and stored in register file 222 (FIG. 2). For example, R3 has been renamed to R3' (R27), R3" (R51), and R3'" (R63) in FIG. 5 to show that renamed operands can be used while processing the instructions.

FIG. 5 also includes columns labeled EQ0 (Execution Queue 0), EQ1 (Execution Queue 1), LQ0 (Load Queue 0), LQ1 (Load Queue 1), and LQ2 (Load Queue 2), which show room for two instructions every clock cycle. The instructions are placed in the queues starting at the bottom slot. The execution queues EQ0, EQ1 execute instructions in-order while load queues LQ0, LQ1, and LQ2 can execute dependent instructions in-order in the same queue and independent instructions out-of-order in different queues.

Each instruction is allowed 2 source operands and 1 destination operand, not counting the conditional bits. Complex instructions such as load and store are separated into micro-operations or micro-instructions. For example, a store instruction can be separated into an address calculation operation and a move operation. Store micro-instructions can go to different queues because the micro-instructions can be performed independently. Load micro-instructions go to the same queue.

| | |
|---|---|
| Clock Cycle 1: | Instruction I0: ADD R1, R2, R3 |
| | Instruction I1: ADD R4, R4, R5 |

For the first clock cycle C1 shown in FIG. 5, ADD instructions I1 and I0 are loaded into respective queues EQ0 and EQ1 because the operands are not dependent on one another.

| Clock Cycle 2: | Instruction I2: ADD R2, R2, R3 |
|---|---|
|  | Instruction I3: ADD R4, R2, R6 |

For the second clock cycle C2, the source operand R2 in ADD instruction I3 depends on the result of the ADD instruction that has R2 as a destination operand in instruction I2. Accordingly, instruction I3 is loaded into queue EQ0 for execution after instruction I2.

| Clock Cycle 3: | Instruction I4: ADD R4, R4, R6 |
|---|---|
|  | Instruction I5: LD R5, R2, R7 |

For the third clock cycle C3, the operand R4 in ADD instruction I4 depends on the result of the ADD instruction that uses R4 as a destination operand in instruction I3. Accordingly, instruction I4 is loaded into Queue EQ0 after instruction I3. Instruction I5 is loaded into queue LQ0. Note that LD instruction I5 is separated into instructions I5A and I5 with instruction I5A being placed in the queue before instruction I5. The corresponding pending fields in the queue entries 300 will be set to "pending" for instruction I5 and "not pending" for instruction I5A if the cache data is ready to be loaded.

| Clock Cycle 4: | Instruction I6: LD R7, R2, R1 |
|---|---|
|  | Instruction I7: LD R0, R2, R6 |

For the fourth clock cycle C4, load instructions I6 and I7 have been separated into micro-instructions I6a, I6, and I7a, I7 and placed in queues LQ1 and LQ2, respectively. The oldest instruction I6A will be executed before instruction I7A, so instruction I7A will remain in queue LQ2 until instruction I6A is executed. Instructions I4 and I5 have advanced in queues EQ0 and LQ0, respectively. Instruction I5 remains in the queue due to pending indicator being set until data ready signal is sent by load/store unit 224.

| Clock Cycle 5: | Instruction I8: ADD R6, R5, R3 |
|---|---|
|  | Instruction I9: ADD R3, R2, R3 |

Regarding the fifth clock cycle C5, a source operand for ADD instruction I8 depends on the result of instruction I5, so instruction I8 is placed in queue LQ0 after instruction I5. When instruction I5 receives a data ready signal from load/store unit 224, instruction I5 becomes a MOVE instruction that is to be completed in the next clock cycle and scheduled for execution by integer arbiter 218. The source operands in ADD Instruction I9 are independent of the other preceding instructions, so instruction I9 is placed in queue EQ0. Instruction I9 can be executed out-of-order and write to R3', preserving R3 to be read in the future for instruction I8. Note that source operand R3 has been renamed to destination operand R3' in instruction I9. In register file 222 (FIG. 2), R3 and R3' can have one or more different names, such as R27. Instruction I6 has moved to the next position in queue LQ1 and instructions I7 and I7A remain in queue LQ2 with the "pending" indicator for instruction I7A being not set and the "pending" indicator for instruction I7 set.

| Clock Cycle 6: | Instruction I10: JMP R6 |
|---|---|
|  | Instruction I11: ADD R7, R5, R3' |

In clock cycle C6, JMP instruction I10 depends on instruction I8, so instruction I10 is placed in queue LQ0 after instruction I8. ADD instruction I11 is independent of instructions in the previous clock cycle and is therefore placed in queue EQ0. Instruction I6 has experienced a cache miss in the previous clock cycle and remains in queue LQ1. LD instruction I7 is allowed to advance in queue LQ2 upon completion of instruction I7A.

| Clock Cycle 7: | Instruction I12: ADD R3", R2, R3' |
|---|---|
|  | Instruction I13: ADD R0, R5, R3" |

During the seventh clock cycle C7, ADD instruction I12 is placed in queue EQ0 and ADD instruction I13 is placed in queue EQ1. JMP instruction I10 has advanced in queue LQ0 and proceeds to branch execution unit 228 (FIG. 2). Instruction I6 is still waiting for data after a cache miss during clock cycle C6. Instruction I7 receives a cache hit in queue LQ2. Note that source operand R3' has been renamed to destination operand R3" in ADD instruction I12. In register file 222 (FIG. 2), R3, R3', and R3" can have one or more different names, such as R27 and R51.

| Clock Cycle 8: | Instruction I14: ADD R3''', R2, R3" |
|---|---|
|  | Instruction I15: ADD R7, R7, R3''' |

In the eighth clock cycle C8, ADD instruction I14 is added to queue EQ0. ADD instruction I15 depended on both I14 and I6 but I6 has longer latency due to cache miss, so instruction I15 is sent to LQ1 after instruction I6 since instruction I15 depends on the result of instruction I6 and instruction I6 is still waiting for cache data in queue LQ1. Note that source operand R3" has been renamed to destination operand R3''' in ADD instruction I14. In register file 222 (FIG. 2), R3, R3', R3" and R3''' can have one or more different names, such as R27, R51, and R63.

In some situations (not shown), an instruction may depend on two outstanding load instructions, so the instruction is sent to both queues with a "duplicate" bit set. As one of the duplicate instructions reaches the head of the queue, it will be invalidated. The "duplicate" bit for the other instruction in the other queue will be cleared. In case both "duplicate" instructions reach the front of the pipe at the same time, a fixed priority can be used to invalidate one set of dependant instructions. Note that this is the case when both source operands can be forwarded.

Figure 6:
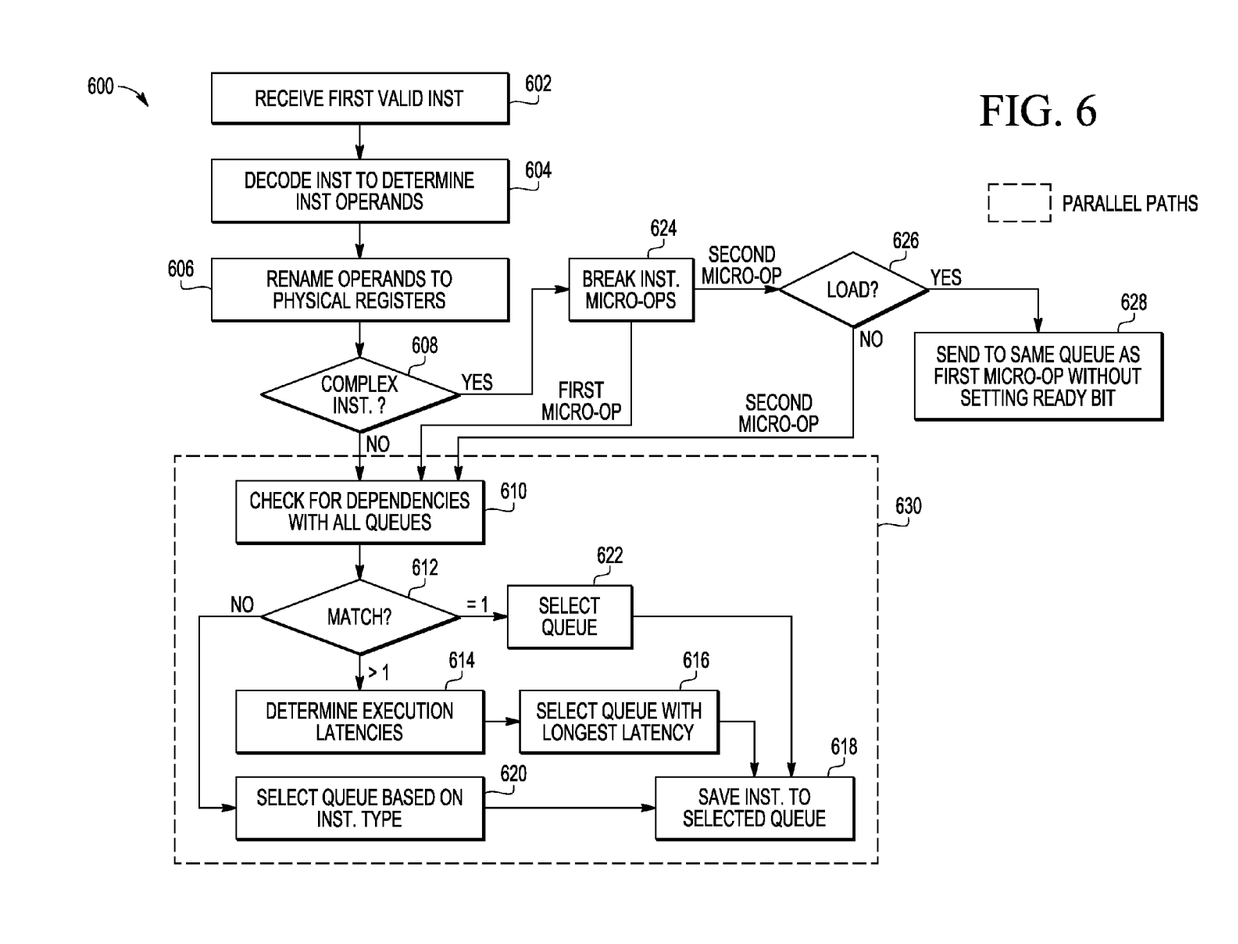
FIG. 6 is a flow diagram of an embodiment of a method for processing a first instruction of a clock cycle in the computer processor of FIG. 2.

Referring to FIGS. 2 and 6, FIG. 6 shows a flow diagram of an embodiment of a method 600 for processing a first instruction of a clock cycle in the computer processor 102 by decode unit 202 of FIG. 2. During a clock cycle of processor 102, process 602 receives a first valid instruction. The validity of the instruction can already be verified by another process performed in another component of the processor 102, such as thread instruction unit 200.

Process 604 can include decoding the instruction to determine instruction type and instruction operands, including source and destination operands.

Process 606 can include renaming the instruction operands to the latest mapping in register file 222. If multiple sequential instructions write to a register that is being read by a prior instruction, the registers can be renamed to speed up processing by allowing computer instructions to execute in parallel instead of serially.

Process 608 can include determining whether the instruction is complex. An instruction is considered complex when it can be separated into two or more micro-instructions. For example, a store instruction can be separated into a first micro-instruction to calculate an address, and a second micro-instruction to move data to the address.

If a complex instruction has not been received, process 610 determines dependencies of the current instruction on any instructions that have already been loaded in execution queues 206-214, 232-236. A dependency typically arises when an operand is used as a source operand in an instruction that issues after an instruction that uses the operand as a destination operand.

Process 612 checks whether zero, one, or more than one dependencies were found in process 610. If more than one dependency is found, process 614 determines execution latencies of the queues and process 616 selects the queue with the longest latency. The queue with the longest latency includes instructions that are dependent on the preceding instruction, and the instructions in the queue are executed in order. Process 618 saves the instruction in the queue selected in process 616, i.e., the queue with the longest latency. If latencies are not known, i.e., multiple cache misses occur, then the instruction is sent to both queues with duplicated bits set.

If one dependency is found in process 612, process 622 selects the queue where the instruction on which the current instruction depends has been placed, and process 618 saves the current instruction to the selected queue.

If no dependencies are found in process 612, process 620 selects a queue based on the type of instruction. For example, an integer instruction can be placed in an integer queue, a load instruction can be placed in a load queue, etc. For multiple load queues, the load queue can be selected on a round robin basis. Process 618 saves the instruction to the selected queue.

Returning to process 608, if the current instruction is a complex instruction, process 624 separates the instruction into micro-instructions. The first micro-instruction is sent through processes 610-622 as discussed hereinabove and included in process group 630 within a dashed outline in FIG. 6. To process the second micro-instruction, process 626 checks whether the current instruction is a load instruction. If the current instruction is a load instruction, process 628 sends the second micro-instruction to the same queue selected for the corresponding first micro-instruction setting the pending indicator (PEND) (e.g., PEND=1). If process 626 determined the second micro-instruction is not a load instruction, then the second micro-instruction is sent through process group 630. Note that the first and second micro-instructions can be processed in parallel by one or more decode units 202, 252.

In some embodiments, process 600 saves the first micro-instruction to a first selected queue when one or more of the operands of the first micro-instruction depend on a first instruction already present in the first selected queue. The second micro-instruction is saved to a second selected queue when one or more of the operands of the second micro-instruction depend on a second instruction already present in the second selected queue. The first selected queue is different from the second selected queue.

Logic implementing processes 602-628 can be executed in decode units 202, 252 (FIG. 2) or other suitable component of processor 102.

Figure 7:
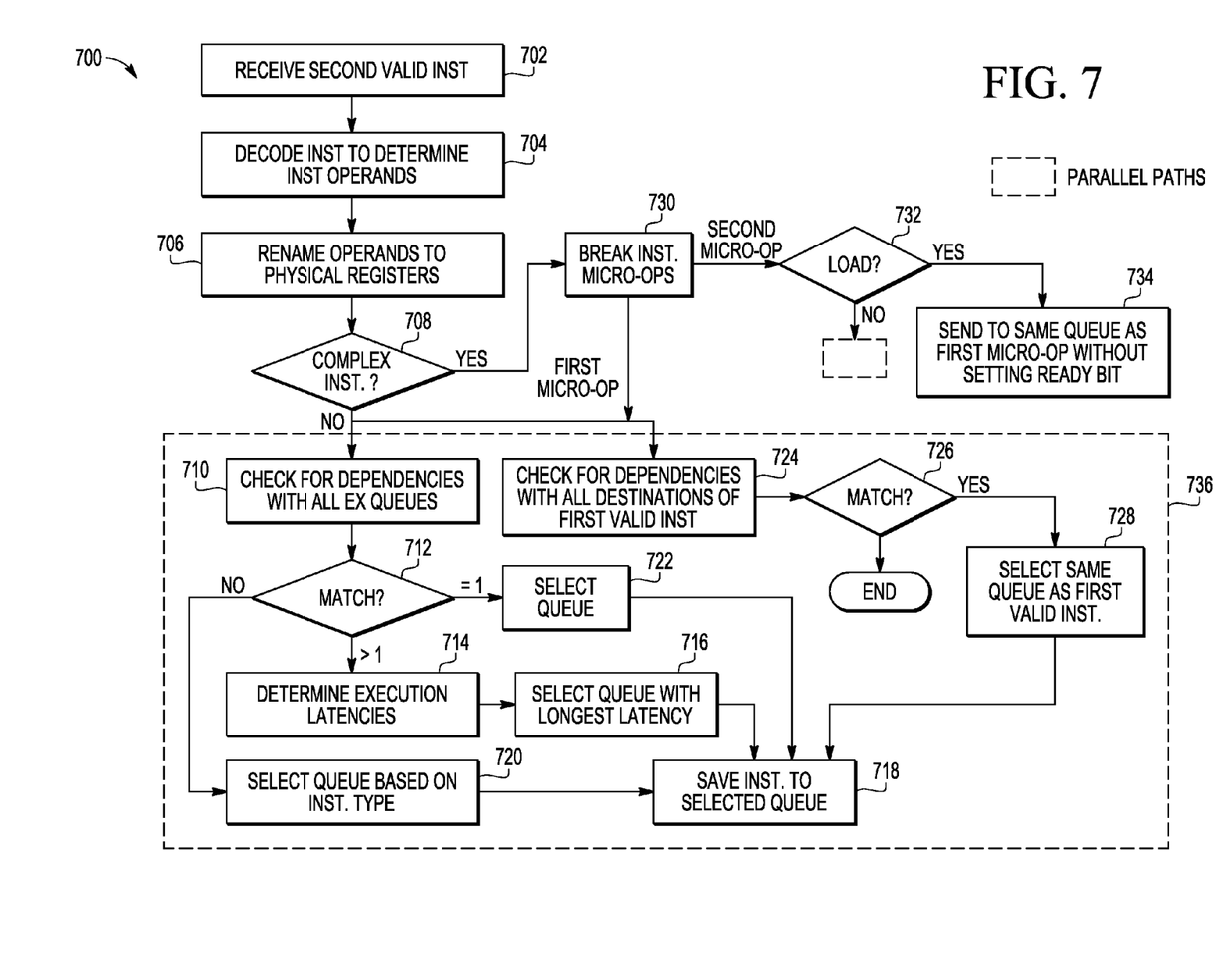
FIG. 7 is a flow diagram of an embodiment of a method for processing a second instruction of a clock cycle in the computer processor of FIG. 2.

Referring to FIGS. 2 and 7, FIG. 7 shows a flow diagram of an embodiment of a method 700 for processing a second instruction of a clock cycle in the computer processor 102 of FIG. 2. During a first clock cycle of a processor, process 702 receives a second valid instruction. The validity of the instruction can already be verified by another process performed in another component of the processor 102, such as thread instruction unit 200.

Process 704 can include decoding the instruction to determine instruction type and instruction operands, including source and destination operands.

Process 706 can include renaming the instruction operands to the latest mapping in register file 222. If multiple sequential instructions write to a register while the register is being read, the registers can be renamed to speed up processing by allowing computer instructions to execute in parallel instead of serially.

Process 708 can include determining whether the instruction is complex. An instruction is considered complex when it can be separated into two or more micro-instructions. For example, a store instruction can be separated into a first micro-instruction to calculate an address, and a second micro-instruction to move data to the address.

If a complex instruction has not been received, process 710 determines dependencies of the current instruction on any instructions that have already been loaded in instruction queues 206-214, 232-236. A dependency typically arises when an operand is used as a source operand in an instruction that issues after an instruction that uses the operand as a destination operand.

Process 712 checks whether zero, one, or more than one dependencies were found in process 710. If more than one dependency is found, process 714 determines execution latencies of the queues and process 716 selects the queue with the longest latency. The queue with the longest latency includes instructions that are dependent on the preceding instruction, and the instructions in the queue are executed in order. Process 718 saves the instruction in the queue selected in process 716, i.e., the queue with the longest latency. In case the latencies are not known, i.e., multiple cache misses, then instruction is sent to both queues with duplicated bits set.

If one dependency is found in process 712, process 722 selects the queue where the instruction on which the current instruction depends has been placed, and process 718 saves the current instruction to the queue selected in process 722.

If no dependencies are found in process 712, process 720 selects a queue based on the type of instruction. For example, an integer instruction can be placed in an integer queue, a load instruction can be placed in a load queue, etc. Process 718 saves the instruction to the queue selected in process 720.

Process 724 checks for dependencies with all destination operands of the first valid instruction. If process 726 detects dependencies as a result of process 724, the process 728 selects the same queue as the first valid instruction. Process 718 saves the instruction to the selected queue. Note that process 718 will use the result of process 728 over the result of process 716, 720, and/or 722.

Returning to process 708, if the current instruction is a complex instruction, process 730 separates the instruction into first and second micro-instructions. Processes 724-728 are executed in parallel with processes 710-716 and 720-722 for the first micro-instruction and for the second micro-instruction if the second micro-instruction is not a Load instruction. The second micro-instruction is processed through process group 736 including processes 710-728 in parallel with the first micro-instruction if the second micro-instruction is not a Load instruction. If the second micro-instruction is a load instruction, process 734 sends the second micro-instruction to the same queue selected for the corresponding first micro-instruction and sets the pending indicator (PEND) (e.g., PEND=1).

In some embodiments, process 700 saves the first microinstruction to a first selected queue when one or more of the operands of the first micro-instruction depend on a first instruction already present in the first selected queue. The second micro-instruction is saved to a second selected queue when one or more of the operands of the second microinstruction depend on a second instruction already present in the second selected queue. The first selected queue is different from the second selected queue.

Note that logic implementing processes 702-734 can be executed in decode units 202, 252 or other suitable component(s) of processor 102. Additionally, process 600 (FIG. 6) and process 700 can be performed in parallel in a single decode unit 202, 252.

Figure 8:
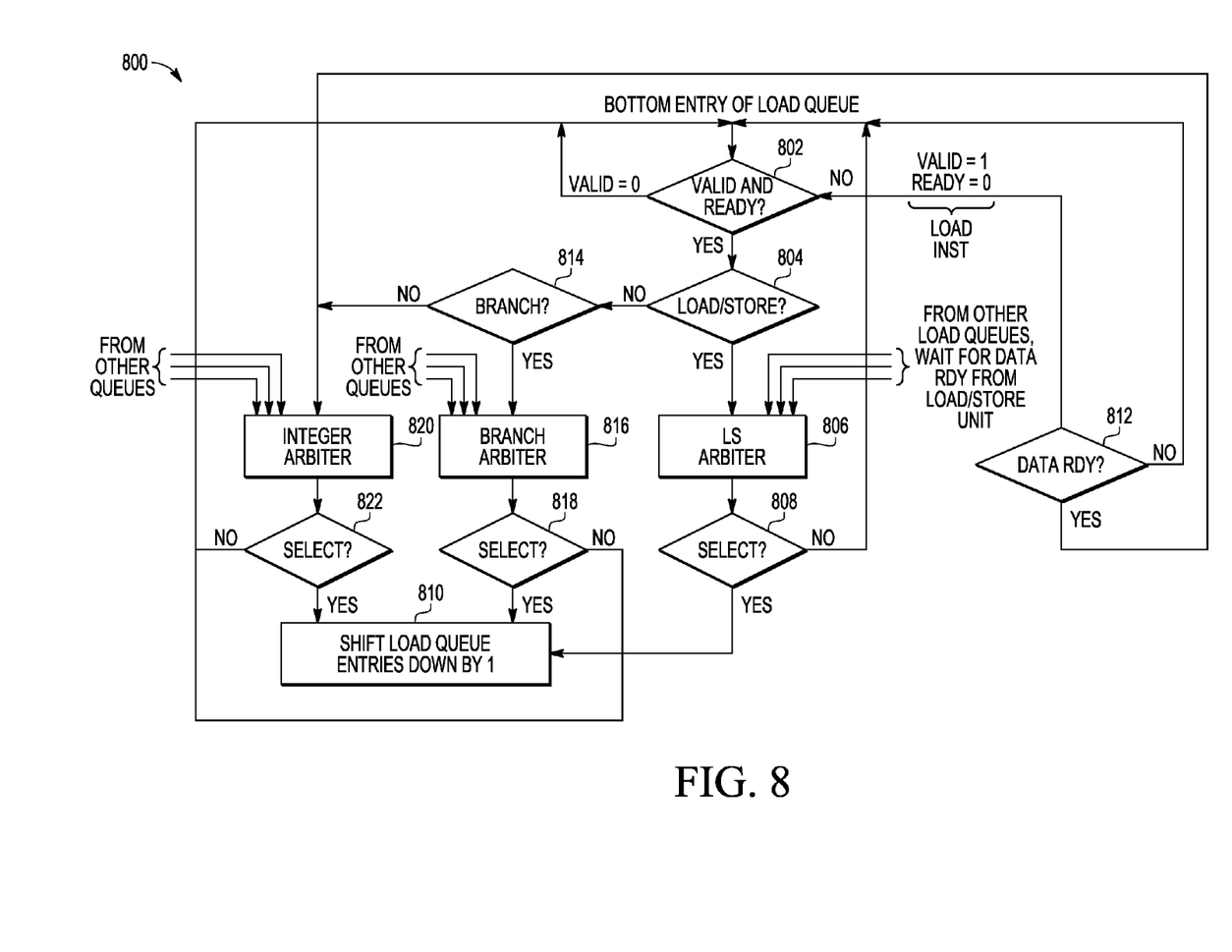
FIG. 8 is a flow diagram of an embodiment of a method for handling instructions at the bottom of load queues in the computer processor of FIG. 2.

Referring to FIGS. 2 and 8, FIG. 8 shows a flow diagram of an embodiment of a method 800 for handling instructions at the bottom of load queues 208-214 in the computer processor 102 of FIG. 2. The term "bottom of load queue" refers to the position in the load queue from which the next instruction will be sent to an execution unit. Process 802 can include checking whether valid (VALID) and pending (PEND) fields are set for an entry associated with an instruction at the bottom of a load queue. If the VALID field is set and PEND field is not set, process 804 can include determining whether the instruction type (ITYPE) is Load or Store. If ITYPE is Load or Store, process 806 can include using load arbiter 216 to arbitrate among instructions at the bottom of load queues 208-214. The load arbiter 216 can select instructions based on a program counter or time tag (LSCNT), on a round robin basis with each load queue being selected in sequence, or on other suitable basis.

Process 808 determines whether the instruction at the bottom of a particular queue was selected to be sent to load/store execution unit 224. If so, process 810 issues the instruction to load/store unit 224 and shifts the remaining entries in the load queue down by one position. If the instruction was not selected, process 808 returns to process 802.

Returning to process 804, if ITYPE is not Load or Store, process 814 determines whether the ITYPE is Branch. If the ITYPE is Branch, process 806 sends the instruction entry to branch arbiter 220 to arbitrate among instructions at the bottom of load queues 208-214, integer queue 232, and complex integer queues 234, 236. The branch arbiter 220 can select a branch instruction to be sent to the branch execution unit 228 based on a program counter or time tag (PCTAG), on a round robin basis with each queue being selected in sequence, or on other suitable basis. Process 818 determines whether the instruction at the bottom of a particular queue was selected to be sent to branch execution unit 228. If so, process 810 issues the instruction to branch unit 228 and shifts the remaining entries in the queue from which the instruction was selected down by one position. If the instruction was not selected, process 818 returns to process 802.

Returning to process 814, if ITYPE is not Branch, process 814 sends the instruction entry at the bottom of the load queue to integer arbiter 218, to arbitrate among instructions at the bottom of integer queue 232, or complex integer queues 234, 236. Integer arbiter 218 can select an integer instruction to be sent to integer execution units 226 based on a program counter or time tag (LSCNT), on a round robin basis with each queue being selected in sequence, or on other suitable basis. Process 822 determines whether the instruction at the bottom of a particular queue was selected to be sent to one of integer execution unit 226. If so, process 810 issues the instruction to one of integer execution units 226 and shifts the remaining entries in the queue from which the instruction was selected down by one position. If the instruction was not selected, process 822 returns to process 802.

Returning to process 802, if the VALID field is not set for the bottom entry, process 800 continues polling the VALID field in process 802 until the VALID field is set. Once the VALID field is set, but the PEND field is not set, process 812 determines whether a data ready signal has been received from load/store execution unit 224. If the data ready signal has been received, the instruction is sent to integer arbiter as a MOVE instruction with the highest priority to be selected by the integer arbiter in process 820. Process 822 determines whether the instruction at the bottom of a particular queue was selected to be sent to one of integer execution unit 226. If so, process 810 issues the instruction to one of integer execution units 226 and shifts the remaining entries in the queue from which the instruction was selected down by one position. If the instruction was not selected, process 822 returns to process 802.

Referring again to process 812, if the DATA_RDY signal was not received, process 812 returns to process 802.

In some embodiments of processes 806-810, a load instruction is taken from a bottom entry of one of load queues 208-214 to provide to the instruction to load/store execution unit 224. After the selected load instruction is provided to load/store execution unit 224, the selected load instruction can remain in the bottom entry of the load queue until a data ready indicator is received from the load/store execution unit 224 in process 812 indicating that data for the selected load instruction will be received in a subsequent clock cycle.

Information regarding an instruction, such as VALID, PEND, LSCNT, and ITYPE, can be provided in an entry or tag, such as entries 300 (FIG. 3) and 400 (FIG. 4), and used as an indicator or signal in processor 102 and methods or processes 600, 700, 800 performed in processor 102.

By now it should be appreciated that systems and methods have been disclosed that achieve latency tolerance execution of instructions in processing system 100. The latency-tolerance execution uses a combination of in-order and out-of-order instruction execution. Instructions are typically issued in order to execution queues 208-214, 232-236. The instructions in each execution queue are executed in order but the instructions from different execution queues can execute out-of-order. Multiple load execution queues are used to allow load instructions to stay in a load execution queue until completion. For Level 1 and Level 2 cache misses, the load instruction can remain in the load execution queue for as many cycles as required to retrieve or store the data. Dependent instructions are issued to the same load execution queue, while independent instructions are issued to different execution queues and can execute out-of-order from the dependent instructions.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Some of the above embodiments, as applicable, may be implemented using a variety of different information processing systems. For example, although FIG. 1 and FIG. 2 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A processor comprising:
   an instruction unit which provides instructions for execution by the processor;
   a decode unit which decodes instructions received from the instruction unit;
   a plurality of execution units;
   a plurality of queues, each coupled to receive instructions from the decode unit, wherein each instruction in a same queue of the plurality of queues is executed in order, and wherein each instruction in the same queue is executed by a corresponding execution unit of the plurality of execution units; and
   a first arbiter coupled to each of the plurality of queues and to a first execution unit of the plurality of execution units, wherein the first execution unit executes instructions of a first instruction type, wherein the first arbiter selects a next instruction of the first instruction type from a bottom entry of a first queue of the plurality of queues for execution by the first execution unit, and further wherein the decode unit, in response to receiving a complex instruction from the instruction unit, separates the complex instruction into a first micro-instruction and a second micro-instruction which together perform the complex instruction, wherein the first micro-instruction is saved to a first selected queue of the plurality of queues, the second micro-instruction is saved to a second selected queue of the plurality of queues, and the first selected queue is different from the second selected queue.

2. The processor of claim 1, wherein the decode unit, in response to receiving a first instruction from the instruction unit, decodes the first instruction to determine operands of the first instruction, wherein the first instruction is saved to a selected queue of the plurality of queues when the operands of the first instruction include a dependency on a second instruction already present in the selected queue.

3. A processor comprising:
   an instruction unit which provides instructions for execution by the processor;
   a decode unit which decodes instructions received from the instruction unit;
   a plurality of execution units;
   a plurality of queues, each coupled to receive instructions from the decode unit, wherein each instruction in a same queue of the plurality of queues is executed in order, and wherein each instruction in the same queue is executed by a corresponding execution unit of the plurality of execution units;
   a first arbiter coupled to each of the plurality of queues and to a first execution unit of the plurality of execution units, wherein the first execution unit executes instructions of a first instruction type, the first arbiter selects a next instruction of the first instruction type from a bottom entry of a first queue of the plurality of queues for execution by the first execution unit, and the decode unit, in response to receiving a first instruction from the instruction unit, decodes the first instruction to determine operands of the first instruction, further wherein the first instruction is saved to a selected queue of the plurality of queues when the operands of the first instruction include a dependency on a second instruction already present in the selected queue; and a register file coupled to the first execution unit, wherein when the first instruction is saved to the selected queue, a dependency indicator for each corresponding operand of the first instruction is stored to indicate whether or not the corresponding operand depends on the second instruction, which is an immediately preceding instruction within the selected queue, wherein:

when the dependency indicator for the corresponding operand indicates that it does depend on the second instruction, the second execution unit feed forwards resulting data for the corresponding operand for use in executing the first instruction, and when the dependency indicator for the corresponding operand indicates that it does not depend on the second instruction, the first execution unit obtains data from the register file for the corresponding operand for use in executing the first instruction.

4. The processor of claim 1, wherein the next instruction of the first instruction type selected by the arbiter results in an out of order execution.

5. A processor comprising:

an instruction unit which provides instructions for execution by the processor;

a decode unit which decodes instructions received from the instruction unit;

a plurality of execution units;

a plurality of queues, each coupled to receive instructions from the decode unit, wherein each instruction in a same queue of the plurality of queues is executed in order, and wherein each instruction in the same queue is executed by a corresponding execution unit of the plurality of execution units;

a first arbiter coupled to each of the plurality of queues and to a first execution unit of the plurality of execution units, wherein the first execution unit executes instructions of a first instruction type, wherein the first arbiter selects a next instruction of the first instruction type from a bottom entry of a first queue of the plurality of queues for execution by the first execution unit; and a common extended queue which is configured to store additional instructions for each queue of the plurality of queues that is full.

6. A processor comprising:

an instruction unit which provides instructions for execution by the processor;

a decode unit which decodes instructions received from the instruction unit;

a plurality of execution units;

a plurality of queues, each coupled to receive instructions from the decode unit, wherein each instruction in a same queue of the plurality of queues is executed in order, and wherein each instruction in the same queue is executed by a corresponding execution unit of the plurality of execution units;

a first arbiter coupled to each of the plurality of queues and to a first execution unit of the plurality of execution units, wherein the first execution unit executes instructions of a first instruction type, wherein the first arbiter selects a next instruction of the first instruction type from a bottom entry of a first queue of the plurality of queues for execution by the first execution unit; and a second arbiter coupled to each of the plurality of queues and to a second execution unit of the plurality of execution units, wherein the second execution unit executes instructions of a second instruction type, wherein the second arbiter selects a next instruction of the second instruction type from a bottom entry of a second queue of the plurality of queues for execution by the second execution unit.

7. A processor comprising:

an instruction unit which provides instructions for execution by the processor;

a decode unit which decodes instructions received from the instruction unit;

a register file;

a load/store execution unit;

a plurality of load queues, each coupled to receive instructions from the decode unit; and a load arbiter coupled to each of the plurality of load queues, the register file, and the load/store execution unit, wherein the load arbiter selects a load instruction from a bottom entry of a first load queue of the plurality of load queues to provide to the load/store execution unit;

wherein after the selected load instruction is provided to the load/store execution unit, the selected load instruction remains in the bottom entry of the first load queue until an indicator is received indicating that data for the selected load instruction will be received in a subsequent clock cycle.

8. The processor of claim 7, wherein the decode unit, in response to receiving a first instruction from the instruction unit, decodes the first instruction to determine operands of the first instruction, wherein the first instruction is saved to a selected execution queue of the plurality of execution queues when the operands of the first instruction include a dependency on a second instruction already present in the selected execution queue.

9. The processor of claim 8, wherein when the first instruction is saved to the selected execution queue, a dependency indicator for each corresponding operand of the first instruction is stored to indicate whether or not the corresponding operand depends on the second instruction, wherein:

when the first instruction is selected for execution by an execution unit and the dependency indicator for the corresponding operand indicates that it does depend on the second instruction, the execution unit feed forwards data for the corresponding operand of the second instruction for use in executing the first instruction, and when the first instruction is selected for execution by the execution unit and the dependency indicator for the corresponding operand indicates that it does not depend on the second instruction, the execution unit obtains data from the register file for the corresponding operand for use in executing the first instruction.

10. The processor of claim 7, further comprising a common extended queue which is configured to store additional instructions for each load queue of the plurality of load queues that is full, wherein each instruction stored in the common extended queue has a corresponding load queue identifier which identifies a load queue of the plurality of load queues to which the instruction belongs.

11. The processor of claim 7, wherein in response to the decode unit decoding a first instruction as a load instruction, the first instruction is saved to an empty load queue of the plurality of load queues, wherein the first instruction is saved as a first micro operation in a first entry of the empty load queue and a second micro operation in an immediately subsequent second entry of the empty load queue.

12. The processor of claim 11, wherein each instruction stored in each queue of the plurality of load queues has a corresponding pending indicator which indicates whether the instruction is available for selection by the load arbiter when the instruction appears in a bottom entry of a load queue, and wherein:
- a first pending indicator corresponding to the first micro operation is set to indicate it is available for selection by the load arbiter, and
- a second pending indicator corresponding to the second micro operation is set to indicate it is not available for selection by the arbiter.

13. The processor of claim 12, wherein the second micro operation remains in a bottom entry of a load queue until an indicator is received indicating that data for the first instruction will be received in a subsequent clock cycle.

14. The processor of claim 7, wherein each instruction stored in the plurality of load queues has a corresponding pending indicator, and the pending indicator is set for a second micro-operation of a load instruction.

15. In a processor having a decode unit, a plurality of load queues coupled to the decode unit, an integer queue, a complex instruction queue coupled to the decode unit, and a load arbiter coupled to the plurality of load queues, a method comprising:
- receiving a first instruction;
- decoding the first instruction by a decode unit to determine an instruction type of the first instruction and operands of the first instruction;
- for the first instruction, the method further comprises:
  - determining whether at least one operand of the first instruction includes a dependency on any instruction stored within any of a plurality of execution queues;
  - when the at least one operand of the first instruction includes the dependency, selecting a second execution queue of the plurality of execution queues which includes a second instruction on which the at least one operand depends and storing the first instruction to the second execution queue;
    - wherein when the first instruction is not a load instruction and the second load queue is full, storing the first instruction to the second load queue comprises:
      - storing the first instruction into an entry of the common extended queue, and
      - storing a load queue identifier in the entry of the common extended queue which identifies the selected load queue; and
  - when there is no operand dependency and the first instruction is a load instruction, selecting a first load queue from the plurality of load queues that is empty and storing the first instruction to the first load queue.

16. The method of claim 15, wherein the processor further comprises, and wherein when the first instruction is not a load instruction, the method further comprises:
- when the at least one operand of the first instruction does not include the dependency, selecting one of the integer queue or the complex instruction queue based on an instruction type of the first instruction and storing the first instruction to the selected queue.

17. The method of claim 15, wherein storing the first instruction to the first load queue when the first instruction is a load instruction comprises:
- storing a first micro operation of the first instruction in a first entry of the first load queue and storing a first pending indicator in the first entry which indicates that the first micro operation is available for selection by the load arbiter when the first micro operation appears in a bottom entry of the first load queue; and
- storing a second micro operation of the first instruction into a second entry subsequent to the first entry of the first load queue and storing a second pending indicator in the second entry which indicates that the second micro operation is not available for selection by the load arbiter when the second micro operation appears in the bottom entry of the first load queue.

18. The method of claim 15, wherein the selecting the second load queue of the plurality of load queues which includes the second instruction is further characterized in that the second instruction has a longer latency than a third instruction on which the at least one operand also depends, wherein the third instruction is stored in a different load queue than the second load queue.

* * * * *